United States Patent
Watermann

(10) Patent No.: US 10,448,133 B2
(45) Date of Patent: Oct. 15, 2019

(54) WIRELESS MICROPHONE OR WIRELESS IN-EAR MONITORING SYSTEM

(71) Applicant: Sennheiser electronic GmbH & Co. KG, Wedemark (DE)

(72) Inventor: Jan Watermann, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 0 days.

(21) Appl. No.: 15/771,600

(22) PCT Filed: Oct. 28, 2016

(86) PCT No.: PCT/EP2016/076081
§ 371 (c)(1),
(2) Date: Apr. 27, 2018

(87) PCT Pub. No.: WO2017/072301
PCT Pub. Date: May 4, 2017

(65) Prior Publication Data
US 2018/0302702 A1 Oct. 18, 2018

(30) Foreign Application Priority Data
Oct. 28, 2015 (DE) .................. 10 2015 118 403

(51) Int. Cl.
*H04R 3/00* (2006.01)
*H04R 1/08* (2006.01)
(Continued)

(52) U.S. Cl.
CPC ............... *H04R 1/08* (2013.01); *H01Q 1/273* (2013.01); *H04B 7/0885* (2013.01); *H04R 3/00* (2013.01);
(Continued)

(58) Field of Classification Search
CPC ........ H04R 1/08; H04R 3/00; H04R 2420/07; H04R 2420/09; H01Q 1/273
(Continued)

(56) References Cited

U.S. PATENT DOCUMENTS 8,332,058 B2 * 12/2012 Buhe ...................... H04R 1/005
455/3.06
2006/0017626 A1 * 1/2006 Kannan .................. H01Q 1/088
343/702

(Continued)

FOREIGN PATENT DOCUMENTS

EP 2 192 788 6/2010

OTHER PUBLICATIONS

German Search Report for application No. 10 2015 118 403.6 dated Jul. 8, 2016.
(Continued)

*Primary Examiner* — Vivian C Chin
*Assistant Examiner* — Ammar T Hamid
(74) *Attorney, Agent, or Firm* — Haug Partners LLP

(57) ABSTRACT

A wireless microphone or wireless in-ear monitoring system. The system has at least one transmitting and/or receiving unit, which comprises at least two antenna modules, each of the antenna modules having an output plug unit, as well as a combining unit with an input interface. Output signals of the at least two antenna modules are received via the input interface of the combining unit. This is done for those input plug units that are inserted into the input interface of the combining unit. This is carried out in order to execute diversity processing of the signals of the antenna modules.

8 Claims, 5 Drawing Sheets

(51) Int. Cl.
*H04B 7/08* (2006.01)
*H01Q 1/27* (2006.01)

(52) U.S. Cl.
CPC ...... *H04R 2420/07* (2013.01); *H04R 2420/09* (2013.01)

(58) Field of Classification Search
USPC .................................. 381/111, 74, 312, 122
See application file for complete search history.

(56) References Cited

U.S. PATENT DOCUMENTS

2007/0168819 A1* 7/2007 Buhe ...................... H04R 1/005
714/746
2014/0334635 A1* 11/2014 Larsson ................... H04R 1/08
381/77

OTHER PUBLICATIONS

International Search Report for Application No. PCT/EP2016/076081 dated Jan. 27, 2017.
Written Opinion for Application No. PCT/EP2016/076081 dated Jan. 27, 2017.

* cited by examiner

WIRELESS MICROPHONE OR WIRELESS IN-EAR MONITORING SYSTEM

The present application claims priority from International Patent Application No. PCT/EP2016/076081 filed on Oct. 28, 2016, which claims priority from German Patent Application No. DE 10 2015 118 401.6 filed on Oct. 28, 2015, the disclosures of which are incorporated herein by reference in their entirety.

FIELD OF THE INVENTION

It is noted that citation or identification of any document in this application is not an admission that such document is available as prior art to the present invention.

The present invention pertains to a wireless microphone or wireless in-ear monitoring system.

Modern wireless microphones and wireless in-ear monitoring systems are wireless audio transmission systems. In order to enhance the transmission quality by means of so-called antenna diversity, two antennas may be provided for receiving a wireless signal transmitted via a high-frequency path, wherein said antennas are typically placed in two different positions. The signals received by the two antennas can then be combined and subjected to subsequent signal processing. Different audio channels can be transmitted in a wireless audio transmission system.

FIG. 1A shows a block diagram of a receiver of a wireless audio transmission system with antenna diversity according to the prior art. The audio receiver 100 features an antenna switch 110 with two inputs for a first and a second antenna A1, A2. The first or the second antenna A1, A2 can be selected by means of the antenna switch 110 and the high-frequency signal HF is then forwarded from the first or the second antenna to a converter unit 120. The high-frequency signal HF is converted into an intermediate frequency signal ZF or into a baseband signal BB in the converter unit 120. The intermediate frequency signal ZF or the baseband signal BB is then converted into an audio frequency signal AF in a demodulating and decoding unit 130. This signal can then be subjected to further audio processing.

FIG. 1B shows the receiver of another wireless audio transmission system according to the prior art. In this system, so-called "true diversity" can be implemented. The audio receiver 200 features a high-frequency converter unit 211, 212 for each antenna A1, A2 in order to convert the high-frequency input signal into an intermediate frequency signal ZF or a baseband signal BB. This intermediate frequency signal ZF or baseband signal BB is converted into an audio frequency signal AF in a demodulating and decoding unit 221, 222. This means that one branch of a high-frequency converter unit 211, 212 and a demodulating and decoding unit 221, 222 is provided for each antenna. An audio switch 230 receives the output signals of the respective branches and selects a signal, which should be emitted as audio frequency signal AF, from these output signals. The decision on which audio signal (of the respective branch) should be used is made, for example, based on a Received Signal Strength Indication RSSI1, RSSI2, wherein the respective high-frequency converter units 211, 212 emits a corresponding RSSI signal to the audio unit 230.

The audio switch 230 therefore selects one of the decoded audio signals based on the received high-frequency signal strength and emits this audio signal as output signal.

FIG. 1C shows the receiver of yet another wireless audio transmission system according to the prior art. In this system, no selection between two paths is made, but the two paths are rather combined. The audio receiver 300 likewise features a high-frequency converter unit 311, 312 for each antenna A1, A2 in order to convert the high-frequency input signal into an intermediate frequency signal ZF or a baseband signal BB. This intermediate frequency signal ZF or baseband signal BB is converted into a digital data stream DS in a demodulating and bit-decoding unit 321, 322. This data stream DS respectively contains information on the quality of each individual bit. This data is therefore usually referred to as "soft bits." The two data streams DS are then combined into a qualitatively superior data stream in a data combining unit 330. This combined data stream DS is then converted into an audio frequency signal AF in the data decoding unit 340.

A block diagram of a conventional wireless audio transmission system is illustrated in FIG. 2. This figure particularly shows a receiving unit or receiving section 400 of the wireless transmission system. The receiving unit 400 features a first and a second input terminal 401, 402, to which a first antenna and a second antenna A1, A2 can be connected. The receiving unit 400 furthermore features a module 410-1, 410-2, 410-n for each audio channel. Each of the modules 410-1-410-n features a first high-frequency processing unit 411-1 for the signals from the first input terminal 401 and a second high-frequency processing unit 412-1 for the signals from the second input terminal 402. The first processing unit 411-1 therefore serves for the high-frequency processing of the signals of the first antenna A1 received via the first input terminal 401. The second processing unit 412-1 accordingly serves for the high-frequency processing of the signals of the second antenna A2 received via the second input terminal 402. Each module features an audio processing unit 413-1 for the audio signal processing of the signals received via the first and the second input terminal 401, 402. In this case, one either selects between or combines the output signals of the first and the second antenna A1, A2 as illustrated in FIGS. 1B and 1C, wherein the selected or combined output signal is then subjected to further processing in order to generate an audio signal from the high-frequency signal. The first module 410-1 features an output terminal 414-1 for the first audio channel. This applies accordingly to the other modules 414-2 to 410-n. Consequently, each of the modules 410-n emits an audio signal of an audio channel.

The receiving unit 400 furthermore features a multichannel audio network 415, which receives the output signals of the modules as input signals and generates an output signal 416 that contains all audio channels 414-1 to 414-n (e.g. in the form of a multiplex signal).

An operational environment of a wireless audio transmission system according to the prior art is schematically illustrated in FIG. 3. FIG. 3 shows a stage area 510, an area 520 for the audience and, for example, a foyer 530. This figure furthermore shows three antennas A1, A2a and A2b. The two antennas A2a and A2b have to be processed via a common path because the receiving unit 400 only contains two inputs 401, 402. The output signal of the antenna A1 can thereby be applied to the input terminal 401. The output signals of the antennas A2a and A2b can be applied to the second antenna terminal 402, e.g. by means of a so-called antenna combiner. In this case, the receiving unit 400 may correspond to the receiving unit 400 according to FIG. 2. It is therefore possible, e.g., to provide two high-frequency reception paths (a first path for a first antenna and a second path for a second antenna) in order to receive the wireless audio signals transmitted on the high-frequency transmission paths. According to FIG. 3, the first antenna has a reception range 540A1, the second antenna has a transmission range 540A2a and the third antenna A2b has a reception range 540A2b. Since the second and the third antenna A2a and A2b are jointly coupled via the second path, this leads to a reduction of their reception range because the two coupled antennas jointly form an undesirable antenna array.

In challenging high-frequency environments such as, in particular, in large halls, it can occur that areas in such an environment are not sufficiently covered by the reception range of one of the antennas.

SUMMARY OF THE INVENTION

The present invention is therefore based on the objective of making available a wireless microphone or wireless in-ear monitoring system that allows an enhanced reception coverage.

A wireless microphone or wireless in-ear monitoring is therefore proposed. The system comprises at least one transmitting and/or receiving unit that features at least two antenna modules with a respective output plug unit, as well as a combining unit with an input interface. The input interface features at least two terminals for one respective antenna module. Output signals of the at least two antenna modules are received via the input interface of the combining unit. This takes place for the respective output plug units that are plugged into the input interface of the combining unit. This is carried out in order to realize diversity processing of the signals of the antenna modules. The antenna modules respectively feature a high-frequency converter unit for converting a high-frequency signal of an antenna module into an intermediate frequency signal or a baseband signal.

According to another aspect of the present invention, the combining unit features a modulating or bit-decoding unit for each antenna channel (i.e. for each coupled antenna module), wherein said modulating or bit-decoding unit respectively converts an intermediate frequency signal or a signal in the baseband into a digital data stream, and wherein the digital data streams are combined in the combining unit.

According to another aspect of the present invention, the antenna modules respectively feature a demodulating or bit-decoding unit that converts the intermediate frequency signal or the signal in the baseband into a digital data stream. The combining unit combines the digital data streams that represent the output signals of the antenna modules.

The invention is based on the notion that a user can now choose the number of antennas and antenna modules as needed rather than being provided with two fixed diversity channels as it is the case in the prior art. If multiple antennas are available, they can be respectively selected in accordance with the best signal quality per microphone channel in order to enhance the wireless transmission by combining the antenna signals. In addition, the range of the system can be increased with additional antennas that are not jointly connected to an antenna input. Furthermore, the number of potential microphone channels can be modularly increased by adding additional antenna modules.

The processing of the audio signals received by an antenna module may optionally take place in the antenna module. This is advantageous because the entire system can thereby be modularly structured and the customer only has to purchase and pay for what is actually needed.

According to an aspect of the present invention, the audio processing of the different audio channels is combined. This leads to one larger audio processing or processing unit rather than many smaller, identical processing units. This is particularly advantageous because the costs per microphone channel are thereby reduced.

When a high-frequency range has to be adapted, for example, it is merely required to exchange the antenna modules. It is no longer necessary to exchange the entire system. This can be achieved, for example, in that the antenna modules subject the audio signals in an independent baseband to IQ signal mixing.

According to the invention, the antenna modules can be operated bidirectionally, i.e. in the form of transmitting or receiving antennas. The flexibility of the entire system is thereby additionally enhanced.

For example, the wireless audio transmission system according to the invention may represent a "Program Making and Special Event System" (PMSE system). A PMSE system is typically used in broadcasting or in wireless microphone systems. PMSE systems represent radio applications in order to transmit video and/or audio for programming and for special events.

BRIEF DESCRIPTION OF THE DRAWINGS

Advantages and exemplary embodiments of the invention are described in greater detail below with reference to the drawings.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1A:
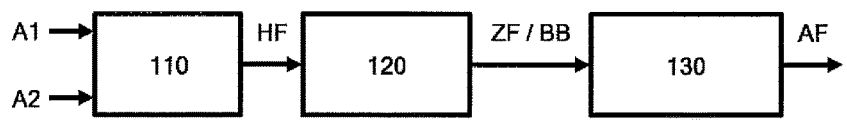
FIG. 1A shows a schematic block diagram of a wireless audio transmission system according to the prior art.
Figure 1B:
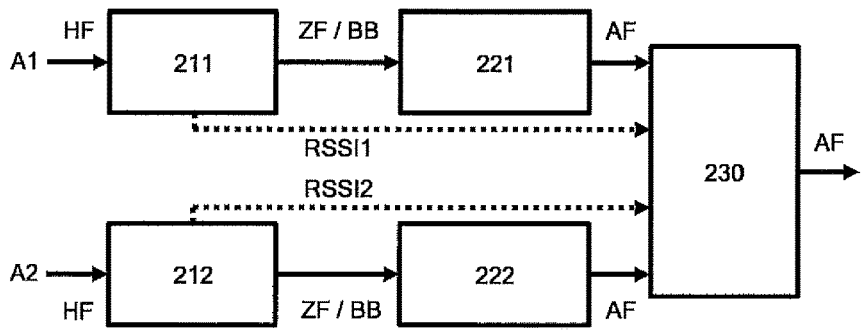
FIG. 1B shows a schematic block diagram of a wireless audio transmission system according to the prior art.
Figure 1C:
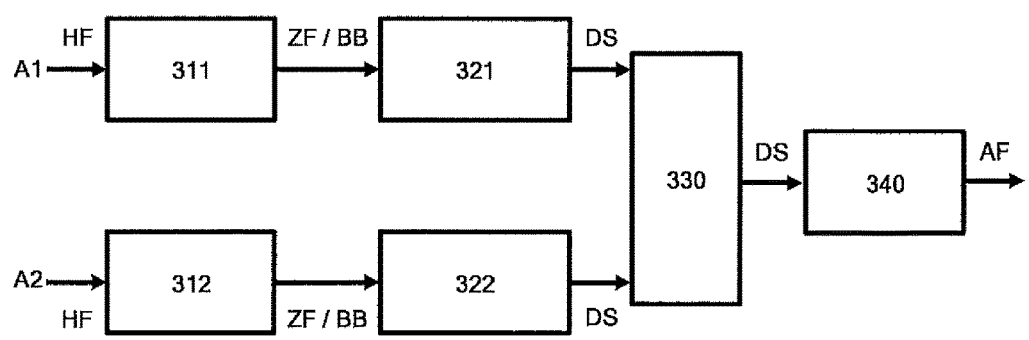
FIG. 1C shows a schematic block diagram of a wireless audio transmission system according to the prior art.
Figure 2:
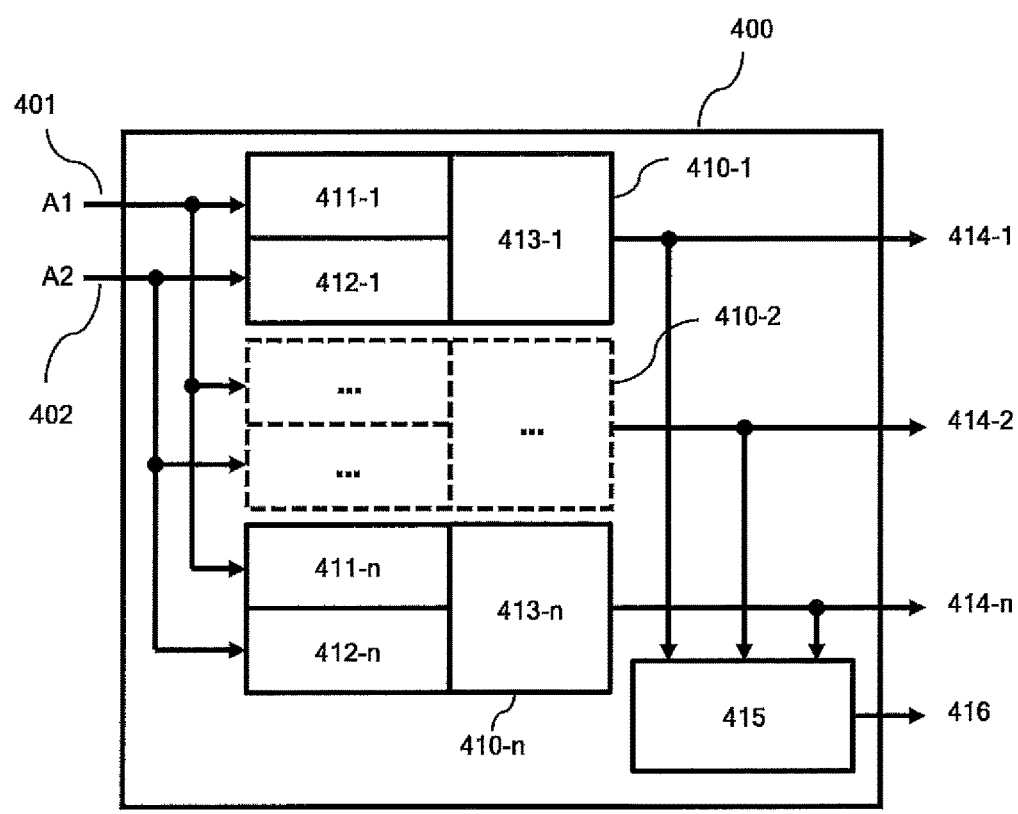
FIG. 2 shows a schematic block diagram of a wireless audio transmission system according to the prior art.
Figure 4A:
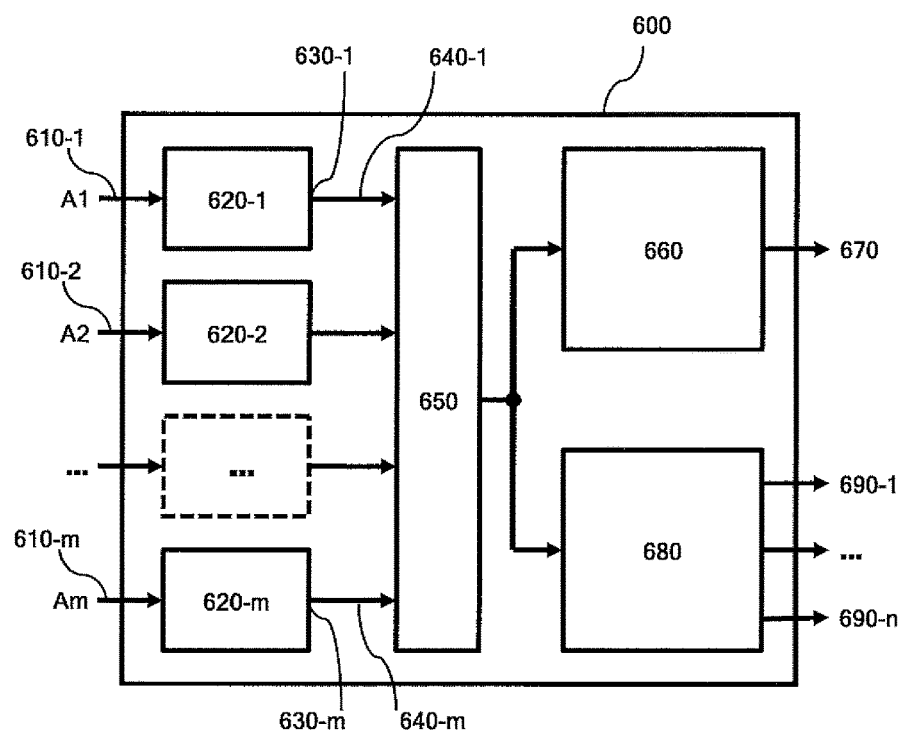
FIG. 4A shows a schematic block diagram of a wireless audio transmission system according to a first exemplary embodiment.

A schematic block diagram of a wireless audio transmission system according to a first exemplary embodiment is illustrated in FIG. 4A. FIG. 4A particularly shows the receiving section or receiving unit 600. The receiving unit 600 features a plurality of input terminals 610-1-610-$m$ for a plurality of antennas A1-Am. The receiving unit 600 additionally features a plurality of antenna modules 620-1 to 620-*m* that respectively serve for processing the signals received by the antennas A1-Am. The antenna modules 620-1-620-*m* respectively feature an input and/or output plug unit 630-1-630-*m*. These antenna modules 620-1-620-*m* can be respectively exchanged. The high-frequency processing of the high-frequency signals of the respective antennas A1-Am, which are received at the corresponding input terminal, therefore respectively takes place in these modules 620-1-620-*m*. This high-frequency processing comprises, e.g., an amplification and optionally filtering of the received high-frequency signals. The demodulating and decoding units 221, 222 illustrated in FIG. 1B or the demodulating and bit-decoding units 321, 322 illustrated in FIG. 1C may also be provided in the antenna modules 620-1 to 620-*m* and used for demodulating or decoding purposes.

The antenna module 620-1 to 620-*m* may therefore feature a high-frequency converter unit 311, 312 for converting the high-frequency input signal into an intermediate frequency signal ZF or a baseband signal BB. This intermediate frequency signal ZF or the baseband signal BB is converted into a digital data stream DS in a demodulating and bit-decoding unit 321, 322. This data stream DS respectively contains information on the quality of each individual with. This data is therefore usually referred to as "soft bits."

The receiving unit 600 furthermore features a combining unit 650 that analyzes the respective high-frequency output signals of the antenna modules 620-1 to 620-*m* in order to determine the signal most suitable for further processing. For example, this may be the antenna signal with the highest received signal strength. The combining unit 650 features an output and/or input interface 640 with a plurality of plug units 640-1-640-*m* for the respective antenna modules 620-1-620-*m*. An (output) plug unit 630-1-630-*m* can be plugged into one of the plug units 640-1-640-*m* of the combining unit 650.

In the prior art, the audio processing is respectively carried out in a module that receives the audio signals of both diversity antennas whereas the audio processing of the different channels according to the first exemplary embodiment takes place in a separate combining unit 650. The receiving unit 600 furthermore features a multichannel audio network 660 and a multichannel audio input/output unit 680.

The multichannel audio network 660 features an output 670, at which all audio channels 1 to n are emitted, for example, in the form of a common digital multiplex signal.

The multichannel audio input/output unit 680 receives the output of the high-frequency combining unit 650 and determines the respective audio channels 690-1 to 690-*n* thereof.

According to the invention, each of the m outputs of the antenna modules 620-1 to 620-*m* can be analyzed for each audio channel n in the combining unit 650 in order to respectively determine which output delivers the best signal or which outputs can be combined.

Figure 4B:
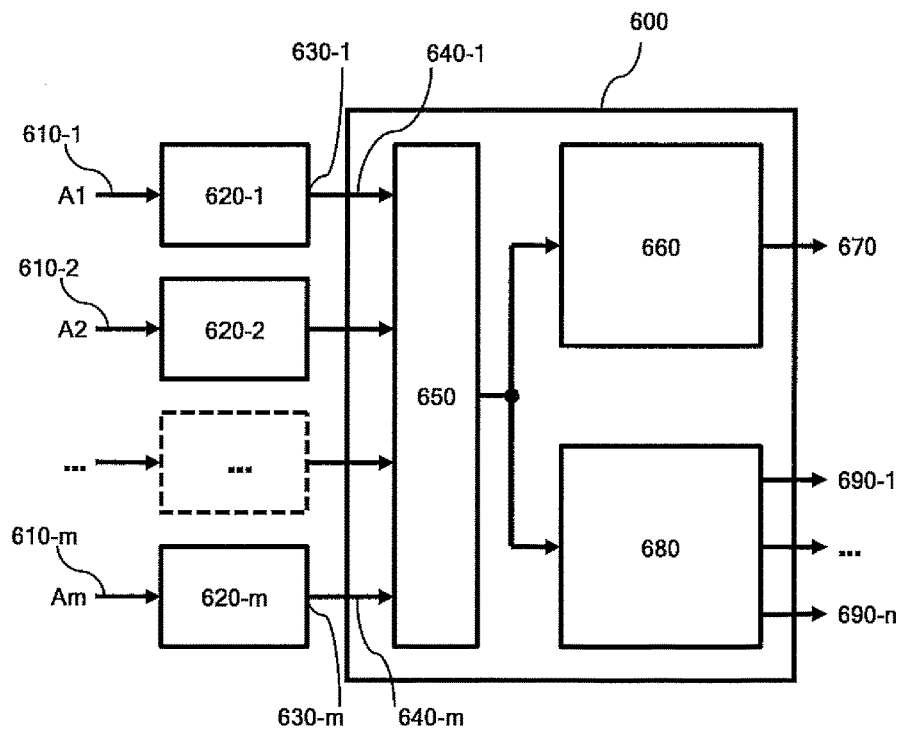
FIG. 4B shows a schematic block diagram of a wireless audio transmission system according to a second exemplary embodiment.

A schematic block diagram of a wireless audio transmission system according to a second exemplary embodiment is illustrated in FIG. 4B. FIG. 4B shows a receiving unit 600, which can essentially be distinguished from the receiving unit 600 in FIG. 4A in that it does not contain the antenna modules 620-1 to 620-*m*. The antenna modules 620-1 to 620-*m* have a functionality that is comparable to that of the antenna modules 620-1 to 620-*m* in FIG. 4A, but they are not arranged in the receiving unit and instead connected to the receiving unit 600 by means of a plug-type connection. The remaining components correspond to those in FIG. 4A.

According to an aspect of the present invention, the antenna module 620-1 to 620-*m* may respectively feature a high-frequency converter unit 311, 312. The antenna module 620-1 to 620-*m* may alternatively feature a high-frequency converter unit 311, 312 and a demodulating unit or a bit-decoding unit 321, 322.

According to an exemplary embodiment of the invention, the exchangeable antenna modules 620-1 to 620-*m* therefore respectively feature a high-frequency converter unit for converting a high-frequency signal into an intermediate frequency signal or a signal in the baseband BB. Optionally, the antenna modules 620-1 to 620-*m* may respectively feature a demodulating unit and/or a bit-decoding unit for converting the intermediate frequency signal or the signal in the baseband into a digital data stream DS.

A receiving unit 600 according to a third exemplary embodiment can be distinguished from the receiving unit 600 according to the first exemplary embodiment in that the antenna modules are no longer realized in the receiving unit 600, but rather externally. Consequently, an intelligent antenna unit is provided for each antenna A1 to Am. The output signals of these antenna units are received by the combining unit 650 and processed in accordance with the first exemplary embodiment.

The antenna modules according to the first, second or third exemplary embodiment can be used as transmitting or receiving antennas such that the overall system allows for greater flexibility.

Figure 3:
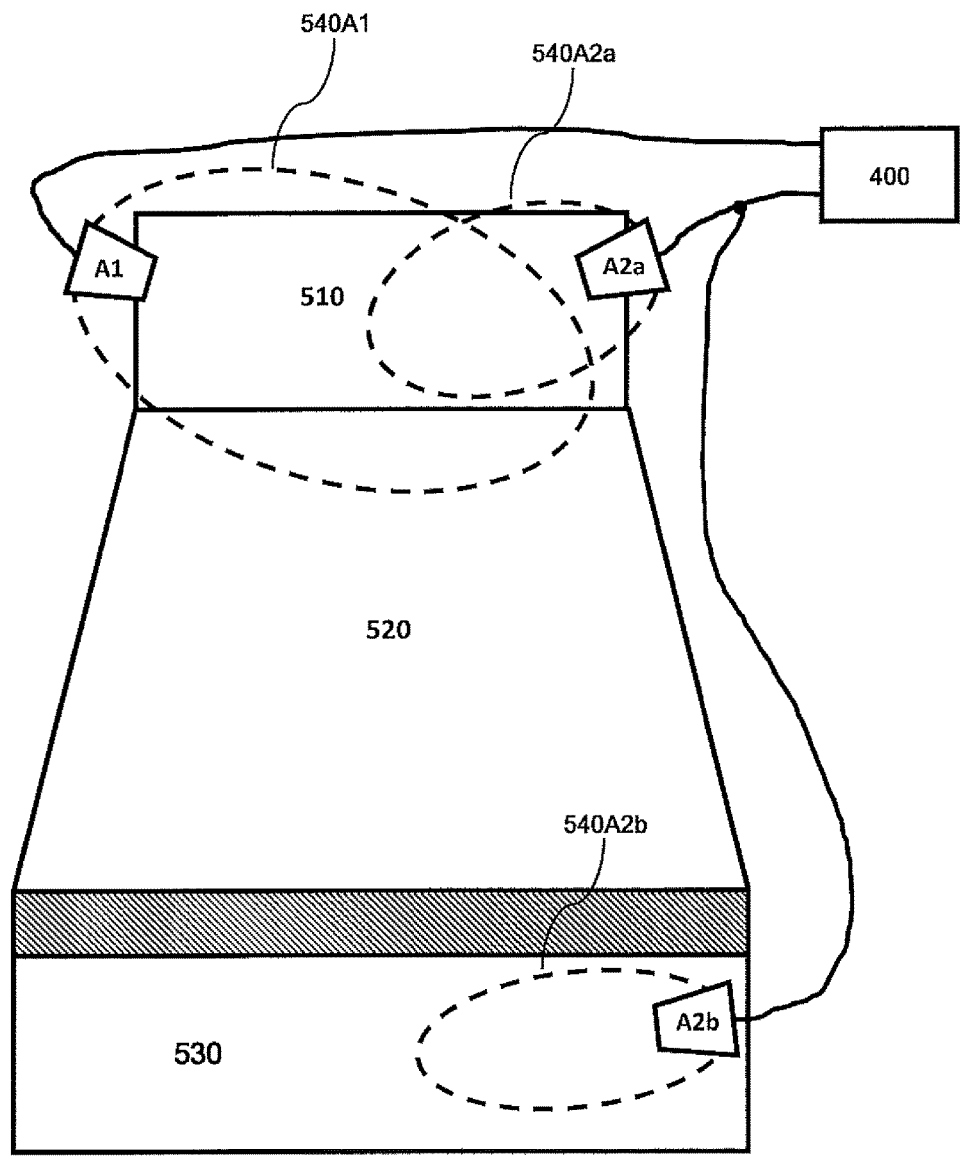
FIG. 3 shows an operational environment with a wireless audio transmission system according to the prior art.
Figure 5:
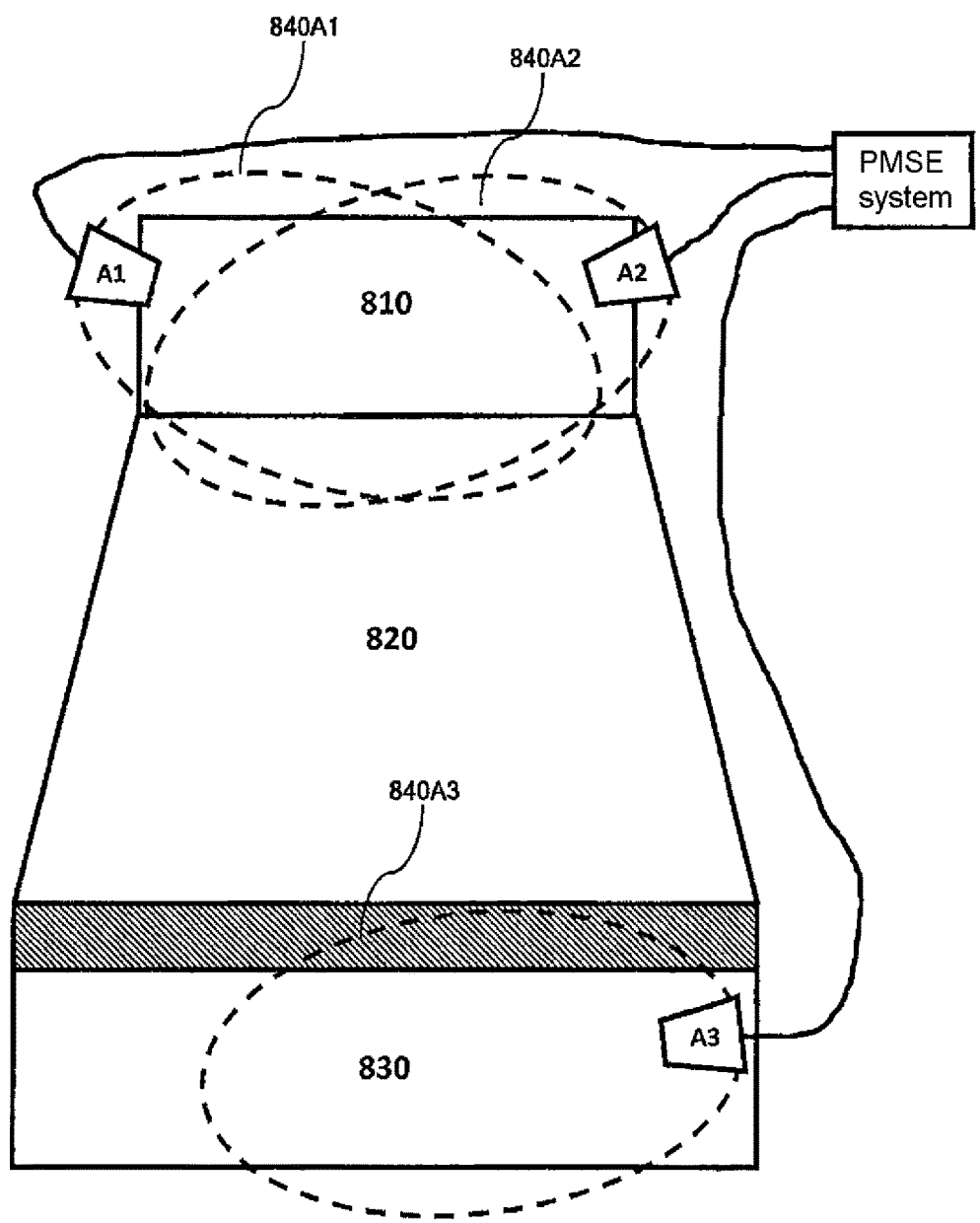
FIG. 5 schematically shows an operational environment with a wireless transmission system according to the invention.

An operational environment with a wireless transmission system according to the invention is schematically illustrated in FIG. 5. FIG. 5 shows a stage area 810, an area 820 for the audience and a foyer 830. Three antennas A1-A3 are furthermore provided. The first and the second antenna A1, A2 are directed at the stage area 810 whereas the third antenna A3 is directed at the foyer 830. The first antenna has a reception range 840A1, the second antenna A2 has a reception range 840A2 and the third antenna A3 has a reception range 840A3. In comparison with the situation according to the prior art illustrated in FIG. 3, the reception ranges of the second and the third antenna are considerably larger in this case.

A receiving section of the wireless audio transmission system was described in the first and the second exemplary embodiment. However, the inventive idea can also be applied to the transmitting section of a wireless audio transmission system.

According to the invention, the flexibility in utilizing an antenna in a wireless audio transmission system is significantly enhanced.

According to the invention, the number of antennas and therefore the number of antenna modules can be increased in order to thereby realize a modular diversity system. According to the invention, the modules 620-1 to 620-*m* may be realized in the form of non-diversity receiver, transmitter or transceiver modules. Each module therefore receives only one output signal of one antenna and carries out the corresponding high-frequency processing (amplification and optional filtering).

According to the invention, the modularity in a wireless audio transmissions system is shifted from an audio channel basis to the high-frequency paths. In this way, greater flexibility can be achieved during the system setup. Existing audio transmission modules and antennas can be used for multiple audio channels in non-critical situations. However, the modules can also be used as additional diversity paths if so required due to the transmission environment. This may be advantageous for enhancing the reception or the coverage in special positions or areas within the reception range of the audio transmission system such that wireless audio signals can also be received in these areas.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A wireless microphone or wireless in-ear monitoring system comprising:
   a transmitting/receiving unit; and
   a plurality of more than two antenna modules, each antenna module being configured to receive a high-frequency signal of an antenna, and each antenna module including:
      a high-frequency converter unit configured to convert the high-frequency signal into an intermediate frequency signal or a baseband signal; and
      an output plug unit configured to output the intermediate frequency signal or baseband signal as an output signal; and
   wherein the transmitting/receiving unit includes:
      a combining unit with an input interface that includes a plurality of more than two plug-type connections into which the output plug units of the plurality of more than two antenna modules can be plugged so as to receive the output signals of the plurality of antenna modules and to carry out diversity processing of the output signals of the antenna modules;
   wherein the combining unit includes a demodulating or bit-decoding unit for each antenna respectively, each demodulating or bit-decoding unit configured to convert the respective intermediate frequency signal or baseband signal of the respective antenna module into a digital data stream;
   wherein the demodulating or bit-decoding units are configured to generate information on the quality of each individual bit of the respective digital data stream;
   wherein the demodulating or bit-decoding units are configured to provide a respective soft bit representation of the respective digital data stream from the respective digital data stream and the respective information on the quality of each individual bit; and
   wherein the combining unit is configured to combine the soft bit representations of the digital data streams into a qualitatively superior combined data stream.

2. The wireless microphone or wireless in-ear monitoring system according to claim 1;
   wherein the antenna modules are not contained in the receiving unit, but rather realized in the form of external modules that are connected to the receiving unit by means of a plug-type connection.

3. A method for operating a wireless microphone or wireless in-ear monitoring system;
   wherein the wireless microphone or wireless in-ear monitoring system includes:
      a combining unit having an input interface; and
      a plurality of more than two antenna modules, each antenna module having a respective output plug unit that is plugged into a respective plug-type connection of the input interface of the combining unit; and
   wherein the method comprises the steps of:
      respectively receiving a high-frequency signal of an antenna by each of the antenna modules;
      converting the respective high-frequency signal into a respective intermediate frequency signal or a baseband signal;
      converting the respective intermediate frequency signal or baseband signal into a respective digital data stream;
      generating information on the quality of each individual bit of the respective digital data stream;
      providing a soft bit representation of the respective digital data stream from the respective digital data stream and the respective information on the quality of each individual bit;
      transmitting an output signal of each of the antenna modules to the combining unit via the plug-type connections; and
      carrying out diversity processing of the output signals of the antenna modules in the combining unit by combining the soft bit representations of the digital data streams into a qualitatively superior combined data stream.

4. The wireless microphone or wireless in-ear monitoring system according to claim 1;
   wherein the antenna modules are contained in and a part of the receiving unit.

5. A receiving or transmitting/receiving unit for a wireless microphone or wireless in-ear monitoring system, the receiving or transmitting/receiving unit comprising:
   a plurality of more than two antenna modules, each antenna module being configured to receive a high-frequency signal of an antenna, and each antenna module including:
      a high-frequency converter configured to convert the high-frequency signal into an intermediate frequency signal or a baseband signal; and
      an output plug unit configured to output the intermediate frequency signal or baseband signal as an output signal; and
   a combining unit with an input interface that includes a plurality of more than two plug-type connections into which the output plug units of the plurality of more than two antenna modules can be plugged so as to receive the output signals of the plurality of antenna modules and to carry out diversity processing of the output signals of the antenna modules;
   wherein the combining unit includes a demodulating or bit-decoding unit for each antenna module respectively, each demodulating or bit-decoding unit being configured to convert the respective intermediate frequency signal or baseband signal of the respective antenna module into a respective digital data stream;
   wherein the demodulating or bit-decoding units are configured to generate information on the quality of each individual bit of the respective digital data stream;
   wherein the demodulating or bit-decoding units are configured to provide a respective soft bit representation of the respective digital data stream from the respective digital data stream and the respective information on the quality of each individual bit; and
   wherein the combining unit is configured to combine the soft bit representations of the digital data streams into a qualitatively superior combined data stream.

6. A receiving or transmitting/receiving unit for a wireless microphone or wireless in-ear monitoring system, the receiving or transmitting/receiving unit comprising:
   a plurality of more than two antenna modules, each antenna module being configured to receive a respective high-frequency signal of a respective antenna, and each antenna module including:
- a high-frequency converter unit configured to convert the respective high-frequency signal into a respective intermediate frequency signal or a baseband signal;
- a demodulating or bit-decoding unit configured to convert the respective intermediate frequency signal or baseband signal into a respective digital data stream and to generate information on the quality of each individual bit of the respective digital data stream and to provide a respective soft bit representation of the respective digital data stream from the respective digital data stream and the respective information on the quality of each individual bit; and
- an output plug unit configured to output the respective soft bit representation of the respective digital data stream as an output signal;

a combining unit with an input interface that includes a plurality of more than two plug-type connections into which the output plug units of the plurality of antenna modules can be plugged so as to receive the output signals of the plurality of antenna modules and to carry out diversity processing of the output signals of the antenna modules by combining the soft bit representations of the digital data streams into a qualitatively superior combined data stream.

7. The wireless microphone or wireless in-ear monitoring system according to claim 6;
   wherein the antenna modules are contained in and a part of the receiving unit.

8. The wireless microphone or wireless in-ear monitoring system according to claim 6;
   wherein the antenna modules are not contained in the receiving unit, but rather realized in the form of external modules that are connected to the receiving unit by means of a plug-type connection.

* * * * *